United States Patent

Grändström et al.

[15] 3,674,840
[45] July 4, 1972

[54] 1-(PARA-ALKOXYALKOXY-PHENYL)-2-HYDROXY-3-ALKYLAMINOPROPANES AND THE SALTS THEREOF

[72] Inventors: Arne Elof Grändström, And Mattssonsgatan 13 B, S-415 06 Goteborg; Per Arvid Emil Carlsson, Torild Wulffsgatan 50, S-413 19 Goteborg; Stig Åke Ingemar Carlsson, Honekullavagen 43 F, S-435 00 Molnlycke; Hans Rudolf Corrodi, Kobbehallsvagen 13, S-436 00 Askim; Lars Ek, Syrnegatan 2 A, S-434 00 Kungsbacka; Bo Robert Lamm, Fridkullagatan 23 A, S-412 62 Goteborg; Bengt Arne Hjalmar Ablad, Folke Bernadottes gata 2, S-411 28 Goteborg, all of Sweden

[22] Filed: May 19, 1970

[21] Appl. No.: 38,884

[30] Foreign Application Priority Data

May 21, 1969 Sweden..................................7153/69

[52] U.S. Cl. ...................260/501.17, 260/307 C, 260/307 F, 260/345.9, 260/348 R, 260/348.6, 260/471 C, 260/490, 260/501.11, 260/501.19, 260/521 R, 260/553 A, 260/559 B, 260/562 A, 260/566 F, 260/570.5 C, 260/570.9, 260/613 D, 424/330
[51] Int. Cl............................................................C07c 93/06
[58] Field of Search..................260/501.11, 501.17, 501.19, 260/570.7

[56] References Cited

UNITED STATES PATENTS

| | | | |
|---|---|---|---|
| 3,275,629 | 9/1966 | Baizer | 260/570.7 X |
| 3,337,628 | 8/1967 | Crowther et al. | 260/570.7 |
| 3,410,901 | 11/1968 | Kunz et al. | 260/570.6 |

*Primary Examiner*—Robert V. Hines
*Attorney*—Brumbaugh, Graves, Donohue and Raymond

[57] ABSTRACT

Compounds of the formula:

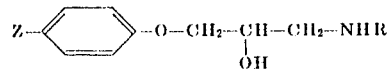

where Z is an oxaradical (a) $R-O-(CH_2)_n-O-$, (b) $R-O-(CH_2)_m-O-(CH_2)_n-O-$; $n$ is an integer equal to 2–3; $m$ is an integer equal to 2–3 and R is an alkyl radical having one to five carbon atoms; and pharmaceutically acceptable, non-toxic, acid addition salts thereof. Illustrative are compounds where R is isopropyl or t-butyl and Z is $CH_3-O-CH_2-CH_2-O-$, or $CH_3-O-CH_2CH_2-O-CH_2CH_2-O-$. Also pharmaceutical compositions containing these compounds, and the use thereof in treating cardiovascular diseases.

8 Claims, No Drawings

1-(PARA-ALKOXYALKOXY-PHENYL)-2-HYDROXY-3-ALKYLAMINOPROPANES AND THE SALTS THEREOF

This application claims the priority of application No. 7153/69 filed in Sweden on May 21, 1969.

BACKGROUND OF THE INVENTION

1. Field of the Invention

The present invention relates to new phenoxy-hydroxypropylamines and more particularly to p-alkoxyalkoxy-substituted phenoxy-hydroxypropylamines and to methods for their preparation. The invention also concerns the preparation of pharmaceutical formulations containing such p-alkoxyalkoxy-substituted phenoxy-hydroxypropylamines and to methods for the pharmacological employment of such compounds.

2. The Prior Art and Objects of the Invention

The principal object of this invention is to provide new p-alkoxyalkoxy-substituted phenoxy-hydroxypropylamine compounds having valuable pharmacological properties.

It is a still further object of the invention to provide new compounds which can be formulated into pharmaceutical preparations in dosage units.

Another object of the invention is to provide compounds which may be employed in the treatment of cardiac diseases.

$\beta$-Receptor blocking agents such as Propranolol (I), Alprenolol (II) and Oxprenolol (III)

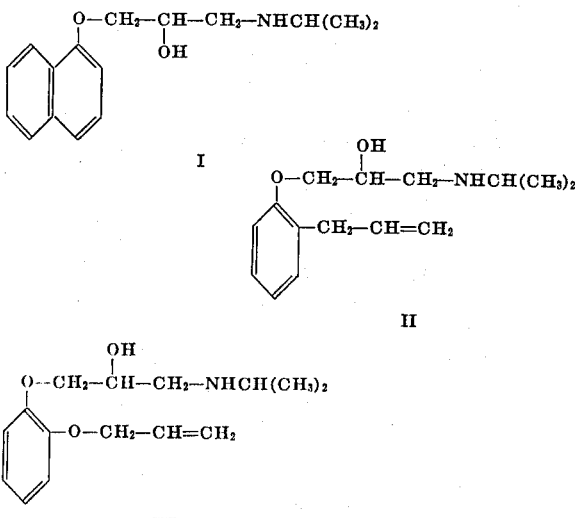

have been shown or alleged to possess therapeutic effects in cardiac and vascular diseases such as angina pectoris, hypertonia, vasoregulatorial neurosthenia and certain forms of arrhythmia.

These compounds, however, have the property of blocking not only the $\beta$-receptors of the heart which leads to the therapeutic effect but also blocking the $\beta$-receptors of the blood vessels and the bronchi. This may lead to undesirable side-effects in patients simultaneously having open or latent asthma. Blocking of the $\beta$-receptors of the bronchi may in such cases lead to bronchospasm and attacks of asthma; for that reason asthma is a contra-indication in the treatment with common $\beta$-receptor blocking substances such as compounds I, II and III above. The vessel-receptor blocking effect of these compounds causes adrenaline segregated from the suprarenal medulla to have a pure pressoreffect instead of the balanced pressor-depressor-effect which adrenaline has in untreated patients.

Thus it is still another object of this invention to provide novel compounds having therapeutic effects in cardiac diseases without producing complications due to beta-blocking in bronchi and blood vessels.

SUMMARY OF THE INVENTION

These and other related objects of the invention are achieved by a class of compounds, and compositions containing such compounds, having the formula:

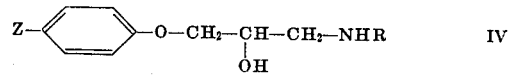

where Z is an oxaradical (a) R—O—(CH$_2$)$_n$—O— or (b) R—O—(CH$_2$)$_m$—O—(CH$_2$)$_n$—O— ; $n$ is an integer equal to 2–3; $m$ is an integer equal to 2–3 and R is an alkyl radical having one to five carbon atoms. This class of compounds of the invention includes pharmaceutically acceptable, non-toxic, acid addition salts thereof.

Illustrative R radicals include methyl, ethyl, n-propyl, isopropyl, sec-butyl, t-butyl, isopentyl, and t-pentyl; isopropyl and t-butyl and preferred radicals for NHR. It is preferred that $n$ is 2 or 3. For R in Z it is preferred that this radical contain one to three carbon atoms, particularly, methyl, ethyl and isopropyl.

Of particular interest are the new p-alkoxyalkoxy substituted phenoxy-hydroxypropylamine derivatives characterized by the formula:

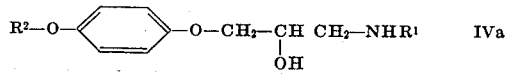

wherein $R^1$ is isopropyl or t-butyl and $R^2$ is selected from the group consisting of —CH$_2$CH$_2$OCH$_3$, —CH$_2$CH$_2$OC$_2$H$_5$, —CH$_2$CH$_2$OCH(CH$_3$)$_2$, —CH$_2$CH$_2$CH$_2$OCH$_3$, and —CH$_2$CH$_2$OCH$_2$CH$_2$CH$_3$; and pharmaceutically acceptable, non-toxic, acid addition salts thereof.

Also the invention includes compositions comprising the defined free basic compound or acid addition salt in association with a pharmaceutically acceptable carrier: solid, semi-solid, liquid or ingestible capsule.

Since the new compounds described above contain an asymmetric carbon atom, they exist in optically active forms which can be resolved into their optical antipode by well-known techniques employing optically active acids such as tartaric acid, camphor-10-sulfonic acid and dibenzoyltartaric acid, N-acetyl-leucine and the like.

METHODS OF PREPARING COMPOUNDS OF THE INVENTION

The p-alkoxyalkoxy-substituted phenoxy-hydroxypropylamines of formula IV may be prepared by:

A. Reacting a compound of the formula

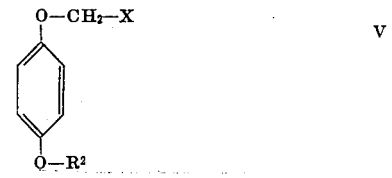

with a compound of the formula

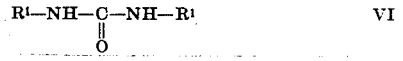

to form a compound of the formula IV in which formulas V and VI $R^1$ and $R^2$ have the same meaning as above, X is

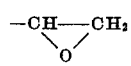

or —CHOH—CH$_2$—Hal, wherein Hal is a halogen atom, preferably chlorine.

Reaction (A) above is preferably carried out in a high-boiling, inert, organic solvent such as 1,2,3,4-tetrahydronaphthalene, decahydronaphthalene, benzonitrile, paraffin oil or chlorinated aromatic compounds or in molten state at a temperature of 150°–220° C, preferably 180°–200° C.

B. Reacting a compound of formula V above with an amine of the formula $H_2N—R^1$ to form a compound of the formula IV.

C. Alkylating a compound of the formula $$\text{Ar}(O—CH_2—CH(OH)—CH_2—NH_2)(O—R^2) \quad \text{VII}$$

reductively by means of hydrogen and acetone to form a compound of the formula $$\text{Ar}(O—CH_2—CH(OH)—CH_2—NH—CH(CH_3)_2)(O—R^2) \quad \text{VIII}$$

D. Alkylating a compound of the formula VII by reaction with a compound of the formula $Hal—R^1$ to form a compound of the formula IV.

E. Hydrolysis of a compound of the formula $$\text{Ar}(O—CH_2—CH(OR^3)—CH_2—NH—R^1)(O—R^2) \quad \text{IX}$$

to form a compound of the formula IV in which formula IX, $R^3$ is a group which can be split off hydrolytically, preferably an acyl or a tetrahydropyranyl group.

F. Hydrolysis of a compound of the formula $$\text{Ar}(O—CH_2—CH—CH_2\text{ (O–C(=O)–N–R}^1\text{ ring)})(O—R^2) \quad \text{X}$$

by means of a strong alkali or a strong acid to form a compound of the formula IV.

G. Hydrolysis or pyrolysis of a compound of the formula $$\text{Ar}(O—CH_2—CH(OH)—CH_2—N(R^1)—C(=O)—NR^4R^5)(O—R^2) \quad \text{XI}$$

to form a compound of the formula IV in which formula XI, $R^4$ and $R^5$, each, is a hydrogen atom, a lower alkyl, an aralkyl or an aryl group.

H. Hydrolysis of hydrogenolysis of a compound of the formula:

$$\text{Ar}(O—CH_2—CH(OH)—CH_2—N(R^1)(R^6))(O—R^2) \quad \text{XII}$$

to form a compound of the formula IV in which formula XII, $R^6$ is a protecting group, such as a benzyl, an acetyl or a carbobenzoxy group.

I. Reacting a phenolate of the formula:

$$\text{Ar}(OM)(O—R^2) \quad \text{XIII}$$

with a compound of the formula $X—CH_2—NHR^1$ to form a compound of the formula IV in which formula XIII, M is a cation, preferably an alkali metal atom.

J. Reducing a compound of the formula $$\text{Ar}(O—CH_2—A—NHR^1)(O—R^2) \quad \text{XIV}$$

preferably by means of a complex alkali metal hydride to form a compound of the formula IV, in which formula XIV, A is $$—CH—C— \text{ or } —C—CH_2—$$
$$\;\;\;\;|\;\;\;\;||\qquad\qquad||$$
$$\;\;\;OH\;\;O\qquad\qquad O$$

K. Hydrolysis of a compound of the formula $$\text{Ar}(O—CH_2—CH(OH)—CH_2—N(R^1)—C(=O)—O—R^7)(O—R^2) \quad \text{XV}$$

to form a compound of the formula IV in which formula XV, $R^7$ is a lower alkyl, an aralkyl or an aryl group, preferably a phenyl group.

L. Hydrogenating a compound of the formula $$\text{Ar}(R^8,R^9,R^{10},R^{11})(O—CH_2—CH(OH)—CH_2—NH—R^1)(O—R^2) \quad \text{XVI}$$

wherein $R^8$, $R^9$, $R^{10}$ and $R^{11}$ are each selected from the group consisting of hydrogen and halogen, such as chlorine or bromine, provided that at least one of $R^8$, $R^9$, $R^{10}$ and $R^{11}$ is halogen, to form a compound of the formula IV.

When a pharmaceutically acceptable, non-toxic, acid addition salt is required, the free basic compound is reacted with the appropriate acid, e.g., hydrochloric, lactic, acetic, sulfamic, and the like.

EXAMPLES OF COMPOUNDS AND SALTS OF THE INVENTION

Example 1. 1-Isopropylamino-3-(p-methoxyethoxyphenoxy)-propanol-2

1,2-epoxy-3-(p-methoxyethoxyphenoxy)-propane (6 g) was dissolved in isopropyl alcohol (25 ml) and mixed with isopropylamine (6 ml). The mixture was refluxed over night whereafter it was evaporated. The base thus obtained which crystallized was stirred with some petroleum ether and filtrated. The base was dissolved in ether and a solution of hydrogen chloride gas in ether was added to pH 5 at which the hydrochloride precipitated. After recrystallization from methyl ethyl ketone the hydrochloride of 1-isopropyl-amino-3-(p-methoxyethoxyphenoxy)-propanol-2 (4.8 g) having a melting point of 92° was obtained. Equivalent weight: Found 320, calculated 320.

1,2-epoxy-3-(p-methoxyethoxyphenoxy)-propane used as starting material was prepared in the following way:

p-Benzyloxy-methoxyethoxybenzene was hydrogenated using Pd/C as catalyst until calculated amount of $H_2$ was taken up yielding p-methoxyethoxyphenol melting at 100° C. The p-methoxyethoxyphenol was then reacted with epichlorohydrin yielding after distillation at reduced pressure 1,2-epoxy-3-(p-methoxyethoxyphenoxy)-propane boiling at 160°–175° C at 1 mm Hg.

EXAMPLES 2 – 6

Using the method described in Example 1 the following compounds were prepared in the form of their hydrochlorides:

Example 2. 1-isopropylamino-3-(p-ethoxyethoxy-phenoxy)-propanol-2; melting point 94° C; equivalent weight found 338, calculated 334.

Example 3. 1-isopropylamino-3-(p-isopropoxyethoxy)-propanol-2; melting point 90° C; equivalent weight found 348, calculated 348.

Example 4. 1-isoproprylamino-3-(p-methoxyethxyethoxyphenoxy)-propanol-2; oil equivalent weight found 375, calculated 378.

Example 5. 1-isopropylamino-3-(p-methoxypropoxypehnoxy)-propanol-2; melting point 107° C; equivalent weight found 345, calculated 334.

Example 6. 1-tert. butylamino-3-(p-methoxypropoxyphenoxy)-propanol-2; melting point 128° C; equivalent weigh found 350, calculated 348.

In the preparation of the above compounds the following para-substituted phenyl glycidyl ethers were used as starting material. (In cases when no boiling point is given the crude product was not distilled but employed directly.)

p-ethoxyethoxyphenyl glycidyl ether, $bp_{0.08}$=133°–148° C;
p-isopropoxyethoxyphenyl glycidyl ether, $bp_{0.35}$=142°–152° C;
p-methoxyethoxyethoxyphenyl glycidyl ether, the crude product was employed;
p-methoxypropoxyphenyl glycidyl ether, the crude product was employed.

These phenylglycidyl ethers were prepared as given in Example 1 from the following hitherto unknown phenols prepared as given in Example 1 from the corresponding benzyloxybenzenes:

p-ethoxyethoxyphenol, $bp_{0.35}$ = 130°–138° C;
p-isopropoxyethoxyphenol, the crude product was employed;
p-methoxyethoxyethoxyphenol, $bp_{0.6}$ = 150°–155° C;
p-methoxypropoxyphenol, $bp_{0.015}$ = 140°–150° C.

EXAMPLE 7 ILLUSTRATING METHOD B 5 g p-methoxyethoxyphenol, 100 ml epichlorhydrine and 0.5 ml piperidine were heated on a boiling water bath for 10 hours. The mixture was thereafter evaporated at reduced pressure and the residue was dissolved in chloroform and was thereupon extracted with hydrochloric acid. The chloroform phase was washed with water, dried and evaporated at reduced pressure. The residue consisting of 3-(p-methoxyethoxyphenoxy)-1-chloropropanol-2, was dissolved in 20 ml isopropyl alcohol to which was added 10 ml isopropylamine and the mixture was heated in an autoclave on a water bath with boiling water for 10 hours. Thereafter the mixture was evaporated and the residue was shaken with a mixture of 2—N NaOH and ether. The ether phase was dried and evaporated at reduced pressure. The thereby obtained residue did crystallize from petroleum ether and in this way obtained 1-isopropylamino-3-(p-methoxyethoxyphenoxy)-propanol-2 with a melting point of 62° C in based form was converted to the hydrochloride in accordance with Example 1. The melting point of the hydrochloride was 92° C.

EXAMPLE 8 ILLUSTRATING METHOD C

A solution of 20 g p-isopropoxy ethoxyphenyl glycidyl ether in 200 ml ethanol saturated with ammonia was heated in an autoclave on a water bath with boiling water for 4 hours. The mixture was thereupon evaporated and the residue was dissolved in ethyl acetate whereupon gaseous hydrochloride was introduced into the solution. The hydrochloride of the amine, which then crystallized, was removed by filtration and 5 g was dissolved in 50 ml methanol and 10 ml acetone. The solution was cooled to 0° C and 5 g sodium borohydride was added in portions during 1 hour. Further 2.5 ml acetone and 0.8 g sodium borohydride were added and the solution was kept at room temperature for 1 hour whereupon 150 ml $H_2O$ was added. The mixture was extracted with ether whereupon the ether phase was dried over potassium carbonate and evaporated. The residue was transformed to the hydrochloride by dissolving the base in ethylacetate and introducing gaseous HCl into the solution. In this way the hydrochloride of 1 - isopropylamino-3 (p-isopropoxyethoxyphenoxy)-propanol-2 was obtained. Melting point 90° C.

EXAMPLE 9 ILLUSTRATING METHOD D

A solution of 10 g p-methoxyethoxyphenyl glycidyl ether in 100 ml ethanol was saturated with ammonia whereupon the mixture was heated upon a water bath containing boiling water for 4 hours. Thereafter the reaction mixture was evaporated and the residue dissolved in ethyl acetate. HCl in gaseous form was introduced causing the amine hydrochloride to crystallize. The crystals were removed by filtration and dissolved in 70 ml ethanol whereto was added 10 ml isopropylbromide and 12 g potassium carbonate. The mixture was heated in an autoclave at 120° C for 10 hours whereupon the ethanol was removed by evaporation. To the residue was added 100 ml 2—N HCl and 100 ml ether. The water phase was separated and alkalized with 2—N NaOH and thereupon extracted with ethylacetate. The ethylacetate phase was dried by means of potassium carbonate whereupon gaseous HCl was introduced. This caused crystallization of the hydrochloride which was separated by filtration and recrystallized from methylethylketone. Thereby obtained hydrochloride of 1-isopropylamino-3-(p-methoxyethoxyphenoxy) propanol-2 had a melting point of 91° C.

EXAMPLE 10 ILLUSTRATING METHOD E

A solution of 8 g 3-(p-methoxyethoxyphenoxy)-1-chloropropanol-2 (prepared for instance according to method (B) in 15 ml dihydropyran was mixed with a pinch of p-toluenesulphonic acid. This caused an increase of the temperature to 50° C and after having been kept at this temperature for 30 minutes the mixture was dissolved in 100 ml of ethanol whereupon 10 ml isopropylamine was added. The reaction mixture was heated in an autoclave for 10 hours on steam bath and was thereafter evaporated. The residue was dissolved in ethylacetate to which was added oxalic acid and was thereupon diluted with ether. Thereby crystallized oxalate was separated and recrystallized from ethanol/ether. To the oxalate was added 50 ml 2—N HCl and the mixture was heated on water bath for 15 minutes. The mixture was after cooling alkalized by addition of NaOH and the base was extracted with ether. The ether phase was dried and evaporated whereafter the residue was dissolved in ethylacetate following by introduction of gaseous HCl. Thereby obtained precipitate was recrystallized from methylethylketone which gave the hydrochloride of 1-isopropylamino-3-(p-methoxy-ethoxyphenoxy)-propanol-2 having a melting point of 90° C.

EXAMPLE 11 ILLUSTRATING METHOD F 5.5 g 3-isopropyl-5-(p-methoxyethoxyphenoxymethyl)-oxazolidinone-2 was dissolved in 60 ml ethanol to which was added a solution of 9 g KOH in 15 ml $H_2O$. The mixture was refluxed for 3 hours. The mixture was thereupon evaporated and the residue dissolved in 2–N HCl and extracted with ether. The water phase was alkalized with NaOH and extracted with ether. After drying by means of potassium carbonate gaseous HCl was introduced causing the hydrochloride of 1-isopropylamino-3-(p-methoxyethoxyphenoxy)-propanol-2 to crystallize. The hydrochloride gave after recrystallization from methylethylketone a product with a melting point of 90° C.

EXAMPLE 12 ILLUSTRATING METHOD A AND G 4.5 g p-methoxyethoxyphenyl glycidyl ether was dissolved in 50 ml tetralin to which was added 5.7 g N,N'-diisopropylurea and 20 g lithium hydroxide whereupon the mixture was heated at 200° C for 3 hours. The reaction mixture was after cooling diluted with 50 ml ether and shaken with 100 ml 2—N HCl. The water phase was extracted with ether and thereupon alkalized by addition of NaOH and was finally shaken with ether. The ether phase was washed with water, dried and evaporated. The residue was dissolved in ethyl acetate and the hydrochloride precipitated by addition of a solution of gaseous HCl in ether. The hydrochloride of 1-isopropylamino-3-(p-methoxyethoxyphenoxy)-propanol-2 with a melting point of 89° C was obtained after recrystallization from methylethylketone.

EXAMPLE 13 ILLUSTRATING METHOD H AND I 0.46 g Na was dissolved in 50 ml alcohol and to the solution was added 3.36 g p-methoxyethoxyphenol and 4.8 g 3-(N-benzyl-N-isopropylamino)-1-chloropropanol-2. The mixture was heated in an autoclave on steam bath over night and was thereupon filtered and evaporated to dryness. To the residue was added 100 ml 2—N HCl and the mixture was extracted with ether whereupon the water phase was alkalized by addition of NaOH and thereupon shaken with ether. The ether phase was dried and evaporated and the residue obtained dissolved in 200 ml alcohol and neutralized with concentrated HCl. To this solution was added 0.5 g Pd/C catalyst and the reaction mixture was hydrogenated at atmospheric pressure until the calculated amount of $H_2$ has been consumed. The reaction mixture was, after filtering, evaporated to dryness and the residue thereupon recrystallized from methylethylketone giving the hydrochloride of 1-isopropylamino-3-(p-methoxyethoxyphenoxy)-propanol-2. Melting point 92° C.

EXAMPLE 14 ILLUSTRATING METHOD J 16.8 g p-methoxyethoxyphenol was dissolved in a solution of 4.6 g sodium in 100 ml ethanol. To the solution was added 12.5 g 2-hydroxy-3-chloropropionic acid and the mixture was refluxed for 3 hours. The mixture was thereupon evaporated and to the residue was added 100 ml 2—N HCl and the resulting mixture was thereupon extracted with benzene. The benzene phase was shaken with sodium bicarbonate solution which was thereupon acidified by addition of HCl followed by an extraction with benzene. After evaporation 2-hydroxy-3-(p-methoxyethoxyphenoxy)-propionic acid was obtained which was converted to N-isopropylamide by dissolving the acid in tetrahydrofuran followed by an addition of isopropylamine and dicyclohexyldicarbodiimide and heating of the reaction mixture at 40° C for 5 hours. The solution was filtered; 5 g lithium aluminum hydride was added to the filtrate and the mixture was refluxed over night. After operation according to conventional methods 1-isopropylamino-3-(p-methoxy-ethoxyphenoxy)-propanol-2 was obtained which after recrystallization from diisopropyl ether gave a product with a melting point of 62° C.

EXAMPLE 15 ILLUSTRATING METHOD K

To 5 g N-isopropyl-N-[3-(p-methoxyethoxyphenoxy)-2-hydroxy-propyl] carbamic acid ethyl ester was added 25 ml 2—N HCl and the mixture was heated on a water bath for 2 hours. The mixture was, after cooling, extracted with ether and the water phase was alkalized by addition of NaOH whereupon followed an extraction with ether. After drying and evaporation and recrystallization from petroleum ether 1-isopropylamino-3-(p-methoxyethoxyphenoxy)-propanol-2 was obtained. Melting point 62° C.

EXAMPLE 16 ILLUSTRATING METHOD L 16.8 g P-methoxyethoxyphenol was dissolved in 100 ml carbontetrachloride whereupon 16 g bromine was added dropwise with simultaneous cooling of the reaction mixture. When the bromine had reacted, the mixture was shaken with water, dried and evaporated whereupon a residue consisting of bromo-p-methoxyethoxyphenol was obtained. This substance was reacted with epichlorohydrine to the formation of the corresponding chlorohydrine and was thereupon reacted with isopropylamine according to Example 7 to obtain 1-isopropylamino-3-(bromo-p-methoxyethoxyphenoxy)-propanol-2. This substance was converted to the hydrochloride and dissolved in 200 ml ethanol and thereupon hydrogenated in the presence of Pd/C-catalyst at atmospheric pressure. When the calculated amount of $H_2$ had been consumed the reaction mixture was filtered and evaporated. The residue was dissolved in $H_2O$ and alkalized by addition of NaOH and thereupon extracted with ether. 1-isopropylamino-3-(p-methoxyethoxyphenoxy)-propanol-2 was obtained after drying, evaporating and recrystallization from petroleum ether.

EXAMPLE 17

Resolving of 1-isopropylamino-3-(p-methoxyethoxyphenoxy)-propanol-2

2.83 g of the free base of 1-isopropylamino-3-(p-methoxyethoxyphenoxy)-propanol-2 and 1.73 g N-acetyl-L-leucine were dissolved in 30 ml ethylacetate. The crystallized fraction had, following three recrystallizations from ethylacetate, a $[\alpha]_{365}^{25} = -62.5°$ ($c = 1$, $H_2O$) and a melting point of 125° C. This salt was converted to the hydrochloride by means of alkalized extraction with ether and treatment with gaseous HCl. Melting point 110° C and $[\alpha]_{365}^{25} = -32°$ ($c = 1$, $H_2O$). In the same way the optical antipode based on N-acetyl-D-leucine was obtained. $[\alpha]_{365}^{25} = +62.5°$ ($c = 1$, $H_2O$). Melting point 125° C.

PHARMACEUTICAL COMPOSITIONS, EXAMPLES, AND UTILITY

In clinical practice the compounds of the present invention will normally be administered orally, rectally or by injection, in the form of pharmaceutical preparations comprising the active ingredient either as a free base or as a pharmaceutically acceptable non-toxic, acid addition salt, in association with a pharmaceutically acceptable carrier. Accordingly, terms relating to the novel compounds of this invention whether generically or specifically are intended to include both the free amine base and the acid addition salts of the free base, unless the context in which such terms are used, e.g., in the specific examples, would be inconsistent with the broad concept. The carrier may be a solid, a semi-solid or a liquid or an ingestible capsule.

These pharmaceutical preparations constitute a further aspect of this invention. Usually the active substance will constitute between 0.1 and 95 percent by weight of the preparation; more specifically between 0.5 and 20 percent by weight for preparations intended for injection and between 2 and 50 percent by weight for preparations intended for oral administration.

EXAMPLE 18

A syrup containing 2 percent (weight per volume) of the active substance was produced from the following ingredients:

| | |
|---|---:|
| 1-isopropylamino-3-(p-methoxyethoxyphenoxy)-propanol-2 HCl | 2.0 g |
| Saccharin | 0.6 g |
| Sugar | 30.0 g |
| Glycerol | 5.0 g |
| Flavoring agent | 0.1 g |
| Ethanol 96% | 10.0 ml |
| Distilled water | to 100.0 ml |

The sugar, saccharin and the ether salt were dissolved in 60 grams of hot water. After cooling, the glycerol was added and a solution of the flavoring agent in ethanol was added. The mixture was then made up to a volume of 100 milliliters with water.

The active substance shown above may be replaced by other pharmaceutically acceptable acid addition salts.

EXAMPLE 19

1-isopropylamino-3-(p-ethoxyethoxyphenoxy)-propanol-2 hydrochloride (250 g) was mixed with lactose (175.8 g), potato starch (169.7 g) and colloidal silica (32 g). The mixture was moistened with a 10 percent gelatin solution and granulated through a 12 mesh sieve. After drying, potato starch (160 g), talc (50 g) and magnesium stearate (2.5 g) were mixed in and the resulting mixture was pressed into tablets (10.000) containing 25 milligrams of active substance which were suitable for use as tablets. The tablets were marked with break lines to enable a dose other than 25 milligrams or multiples thereof to be administered.

EXAMPLE 20

A granulate was prepared from 1-isopropylamino-3-(p-methoxyethoxyphenoxy)-propanol-2 hydrochloride (250 g), lactose (175.9 g) and an alcoholic solution of polyvinylpyrrolidone (25 g). After drying, the granulate was mixed with talc (25 g), potato starch (40 g) and magnesium stearate (2.50 g) and pressed into 10.000 biconvex tablets. These tablets were first coated with a 10 percent alcoholic shellac solution then with a water solution containing saccharose (45 percent), gum arabic (5 percent), gelatin (4 percent) and dyestuff (0.2 percent). Talc and sugar powder were used as dusting powders after the first 15 applications. The coating was then finished with a 66 percent sugar syrup and polished with a 10 percent carnauba wax solution in carbon tetrachloride.

EXAMPLE 21

1-isopropylamino-3-(p-ethoxyethoxyphenoxy)-propanol-2 hydrochloride (1 g), sodium chloride (0.8 g) and ascorbic acid (0.1 g) were dissolved in sufficient distilled water to make 100 milliliters of solution. This solution, each milliliter of which contained 10 milligrams of the active substance, was used to fill ampoules which were sterilized by heating for 20 minutes at 120° C.

PHARMACOLOGICAL EVALUATION

The compounds prepared according to Examples 1–6 were evaluated for intrinsic activity on heart rate and blockage of the chronotropic and peripheral vasodilator response to isoprenaline in cats. The blockage of isoprenalin-induced relaxation of isolated guinea pig trachea was determined. Further the acute $LD_{50}$ in mice was evaluated. Alprenolol (Formula II) was used as a reference substance.

Cats weighing between 1.8 and 2.8 kg were anesthetized with 30 mg/kg pento-barbital sodium I.p. The cats had been pretreated with reserpine, 5 mg/kg i.m. about 18 hours before the experiment. Bilateral vagotomy was performed before the start of the experiment.

The heart rate was recorded on an Offner cardiotachometer triggered by the EKG. Mean intraarterial blood pressure was recorded from the carotide artery with a strain gauge transducer. One femoral artery was opened in the inguinal region and the leg was perfused by blood delivered through a Sigma Motor Pump at constant rate.

The leg perfusion pressure was recorded via a strain gauge transducer connected to the catheter distally to the pump. The paw was excluded from the circulation by a tight ligature around the ankle. Intravenously injected isoprenaline increased the heart rate and reduced the femoral perfusion pressure. An isoprenalin dose giving a 70–80 percent of the maximal chronotropic response was determined. This dose (usually 0.1 µg/kg) was then repeated with 20-minute intervals. Ten minutes before each isoprenaline injection, the tested substances were administered intravenously for two minutes, starting with a dose of 0.01 mg/kg and increasing each subsequent dose fourfold. The intrinsic heart rate effects of the test substances were determined. The dose producing 50 percent blockage of the isoprenaline responses were evaluated from the plotted log dose-per cent blockage diagrams.

Guinea pig tracheas were prepared according to Timmerman & Scheffer (J.Pharm.Pharmacol. 1968, 20, 78) and suspended in Krebs solution at 37° C with isotonic recording of the contractions. Metacholine was added to the bath to produce a submaximal tone in the muscles. An isoprenaline dose giving 60–70 percent of the maximum relaxation was selected. After repeated washings and recovery of tone a test substance was added. After 15 minutes the effect of the selected dose of isoprenaline was recorded. This procedure was repeated using increasing doses of the test substances and the dose of the test substance reducing the effect of the isoprenaline dose to 50 percent of the initial effect was determined ($ED_{50}$).

The results are summarized in the following Table 1.

TABLE 1

Intrinsic activity on heart rate in cats, beta-blocking activity on heart rate and peripheral vascular resistance in cats and on guinea pig tracheal smooth muscle tone, $LD_{50}$ after i.p. administration in mice.

| Compound of Example No. | Intrinsic activity percent of max. isoprenaline heart rate response | Reserpinized cat | | Guinea pig trachea; β-block $ED_{50}$ µg./ml. | Mouse toxicity; $LD_{50}$ i.p. mg./kg. |
|---|---|---|---|---|---|
| | | β-block heart rate, $ED_{50}$ mg./kg. | β-block peripheral vascular resistance, $ED_{50}$ mg./kg. | | |
| Alprenolol | 20 | 0.1 | 0.05 | 0.03 | 100 |
| 1 | 30 | 0.2 | 16 | 4.0 | 275 |
| 2 | 28 | 0.15 | 40 | 4.0 | 225 |
| 3 | 20 | 0.3 | 15 | 3.0 | 175 |
| 4 | 18 | 0.7 | >20 | >10 | 400 |
| 5 | 25 | 0.3 | 2 | 8.0 | 160 |
| 6 | 10 | 0.6 | 10 | 2.0 | 120 |

All agents had a moderate intrinsic beta-stimulating activity. As regards cardiac beta-receptor blockage the test substances were 1.5 – 7 times less active than Alprenolol. The peripheral vascular beta-blocking activity of the six test substances of the invention was 40–800 times lower than that of Alprenolol. In isolated trachea the test substances were 70–250 times less active than Alprenolol.

The results show that the six test substances of the invention produced a relatively stronger blockage of cardiac beta-receptors than of smooth muscle receptors. Because of their cardioselectivity the substances of the invention can be expected to elicit therapeutic effects in cardiac diseases without producing complications due to beta-blockage in bronchi and blood vessels. The moderate intrinsic beta-stimulating activity of the substances will diminish the risk of eliciting cardiac failure.

We claim:

1. A compound having the formula:

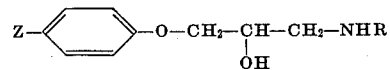

wherein Z is an oxaradical (a) R—O—(CH$_2$)$_n$—O—, or (b) R—O—(CH$_2$)$_m$—O—(CH$_2$)$_n$—O—;
   n is an integer equal to 2–3;
   m is an integer equal to 2–3;
   R is an alkyl radical having one to five carbon atoms; and
      the pharmaceutically acceptable, non-toxic, acid addition salts thereof.

2. A compound of the formula:

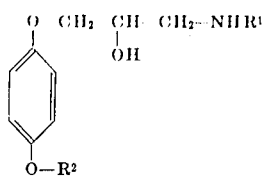

wherein $R^1$ represents isopropyl or t-butyl and $R^2$ is selected from the group consisting of $-CH_2CH_2OCH_3$, $-CH_2CH_2OC_2H_5$, $-CH_2CH_2OCH(CH_3)_2$, $-CH_2CH_2OCH_2CH_2OCH_3$ and $-CH_2CH_2CH_2OCH_3$, and pharmaceutically acceptable, non-toxic acid addition salts thereof.

3. A compound according to claim 2, wherein $R^1$ represents isopropyl and $R^2$ is $-CH_2CH_2OCH_3$, and pharmaceutically acceptable, non-toxic acid addition salts thereof.

4. A compound according to claim 2, wherein $R^1$ represents isopropyl and $R^2$ is $-CH_2CH_2OC_2H_5$, and pharmaceutically acceptable, non-toxic acid addition salts thereof.

5. A compound according to claim 2, wherein $R^1$ represents isopropyl and $R^2$ is $-CH_2CH_2OCH(CH_3)_2$, and pharmaceutically acceptable, non-toxic acid addition salts thereof.

6. A compound according to claim 2, wherein $R^1$ represents isopropyl and $R^2$ is $-CH_2CH_2OCH_2CH_2OCH_3$, and pharmaceutically acceptable, non-toxic acid addition salts thereof.

7. A compound according to claim 2, wherein $R^1$ represents isopropyl and $R^2$ is $-CH_2CH_2CH_2OCH_3$, and pharmaceutically acceptable, non-toxic acid addition salts thereof.

8. A compound according to claim 2, wherein $R^1$ represents t-butyl and $R^2$ is $-CH_2CH_2CH_2OCH_3$, and pharmaceutically acceptable, non-toxic acid addition salts thereof.

* * * * *

PO-1050
(5/69)

UNITED STATES PATENT OFFICE
CERTIFICATE OF CORRECTION

Patent No. 3,674,840      Dated July 4, 1972

Inventor(s) Arne Elof Brändström et al.

It is certified that error appears in the above-identified patent and that said Letters Patent are hereby corrected as shown below:

Page 1, Column 1, change "Grändström" (both places) to -- Brändström --;
Page 1, Column 2, In the Abstract, 1st line after formula, change ", (b) R-" to -- , or (b) R- --;
Page 1, Column 2, In the Abstract, line 4 from the bottom, change "$CH_2-CH_2-O-$," to -- $CH_2-CH_2-O-$, --;
Column 2, line 19, change "and t-butyl and preferred" to -- and t-butyl are preferred --;
Column 2, lines 34 and 35, change "$-CH_2CH_2OCH_2CH_2CH_3$" to -- $-CH_2CH_2OCH_2CH_2OCH_3$ --;
Column 5, line 31, change "(p-methoxyethxyethoxy-" to -- (p-methoxyethoxyethoxy- --;
Column 5, lines 35 and 36, change "(p-methoxypropoxypehnoxy)-" to -- (p-methoxypropoxyphenoxy)- --;
Column 5, line 40, change "weigh" to -- weight --;
Column 6, line 71, change "following" to -- followed --;
Column 6, lines 74 and 75, change "(p-methoxy-ethoxyphenoxy)" to -- (p-methoxyethoxyphenoxy) --;
Column 8, line 14, change "P-methoxyethoxyphenol" to -- p-methoxyethoxyphenol --;
Column 10, Table 1, line 35, line underscoring "Reserpinized cat" should extend over column headed "Intrinsic activity percent of max. isoprenaline heart rate response".

Signed and sealed this 26th day of December 1972.

(SEAL)
Attest:

EDWARD M. FLETCHER, JR.
Attesting Officer

ROBERT GOTTSCHALK
Commissioner of Patents